US009451474B2

United States Patent
Bhanage (10) Patent No.: US 9,451,474 B2
(45) Date of Patent: Sep. 20, 2016

(54) MULTICAST AWARE BEAMFORMING FOR WIRELESS LOCAL AREA NETWORKS

(71) Applicant: Aruba Networks, Inc., Sunnyvale, CA (US)

(72) Inventor: Gautam Bhanage, Sunnyvale, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 122 days.

(21) Appl. No.: 14/336,402

(22) Filed: Jul. 21, 2014

(65) Prior Publication Data

US 2016/0021550 A1 Jan. 21, 2016

(51) Int. Cl.
*H04W 16/28* (2009.01)
*H04W 4/06* (2009.01)
*H04L 12/18* (2006.01)
*H04W 84/12* (2009.01)

(52) U.S. Cl.
CPC ............ *H04W 16/28* (2013.01); *H04L 12/189* (2013.01); *H04W 4/06* (2013.01); *H04W 84/12* (2013.01)

(58) Field of Classification Search
None
See application file for complete search history.

(56) References Cited

U.S. PATENT DOCUMENTS

| 7,529,222 | B2* | 5/2009 | Kim | H04B 7/0408 370/329 |
|---|---|---|---|---|
| 7,570,921 | B2* | 8/2009 | Sugar | H04B 7/0615 455/41.2 |
| 8,305,948 | B2* | 11/2012 | Surineni | H04W 74/0816 370/310 |
| 8,351,365 | B2* | 1/2013 | Seok | H04L 1/1829 370/312 |
| 2007/0171858 | A1* | 7/2007 | Grandhi | H04W 74/002 370/328 |
| 2011/0199953 | A1* | 8/2011 | Seok | H04W 4/06 370/312 |

\* cited by examiner

*Primary Examiner* — Donald Mills (57) ABSTRACT

The present disclosure discloses a method and network device for providing a multicast aware beamforming mechanism in a WLAN. Specifically, a network device receives a multicast message to be transmitted to a plurality of client devices. The network devices then selects a first subset of client devices of the plurality of client devices for focusing a directional radiation pattern, and transmits the multicast message using the directional radiation pattern to the plurality of client devices. Note that, the multicast message is successfully received by each of the plurality of client devices. Further, the plurality of client devices includes (a) the first subset of client devices that are located in an approximate direction of the focus of the directional radiation pattern and (b) a second subset of client devices that are located in a different direction than the focus of the directional radiation pattern.

22 Claims, 9 Drawing Sheets

MULTICAST AWARE BEAMFORMING FOR WIRELESS LOCAL AREA NETWORKS

FIELD

The present disclosure relates to multicast in a wireless local area network (WLAN). In particular, the present disclosure relates to an improved mechanism for providing multicast services via beamforming to clients in WLANs.

BACKGROUND

Wireless digital networks, such as networks operating under the current Electrical and Electronics Engineers (IEEE) 802.11 standards, are spreading in their popularity and availability. Currently, the multicasting mechanism of wireless local area networks (WLANs) generally is independent of any physical layer properties.

When multicasting packets to multiple stations in a WLAN, the radio typically uses the fastest rate supported by the slowest station to determine the multicast rate at which packets will be sent. This is also referred to as multicast rate optimization. This rate may be really slow, which leads to lower multicast performance. Specifically, assuming that there are five client devices that are subscribed to the same multicast group in a WLAN. With multicast rate optimization, the system will determine which of the five client devices is associated with the slowest physical layer rate, and will use the slowest physical layer rate as the multicast rate to transmit the multicast packets to all five client devices. This is so even though the other four client devices are associated with much faster physical layer rate. Because the client devices do not send any acknowledgement frames upon receiving the multicast packets, sending the multicast packets at the slowest physical layer rate increases the likelihood that all five client devices will receive the multicast packets successfully.

Here, physical layer rate generally refers to the actual rate at which the WLAN radio is modulated to transmit packets. Note that, the actual time required to complete transmission of multicast packets also depends on how frequently the packets are being transmitted. Frequent transmission and fast physical layer rate will reduce the amount of transmission time required for multicast packet transmissions, and thus improve the overall data transmission rate. The physical layer rate can also be referred to as modulation and coding scheme (MCS) rate.

Alternatively, the system can convert a multicast packet to multiple unicast packets destined to various client devices. The multicast-to-unicast conversion may be applicable only when there are a small number of client devices in the WLAN. Therefore, an enhanced mechanism (other than physical layer rate optimization mechanism and/or multicast-to-unicast conversion mechanism) is needed to achieve true multicast high performance in WLANs with a large number of client devices or when multicast-unicast conversion is not generally used.

BRIEF DESCRIPTION OF THE DRAWINGS

The present disclosure may be best understood by referring to the following description and accompanying drawings that are used to illustrate embodiments of the present disclosure.

DETAILED DESCRIPTION

In the following description, several specific details are presented to provide a thorough understanding. While the context of the disclosure is directed to beamforming control in wireless network, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to multicasting in a wireless local area network (WLAN). In particular, the present disclosure relates to a multicast aware beamforming mechanism in WLANs.

With the solution provided herein, the disclosed network device receives a multicast message to be transmitted to a plurality of client devices. The network devices then selects a first subset of client devices of the plurality of client devices for focusing a directional radiation pattern, and transmits the multicast message using the directional radiation pattern to the plurality of client devices. Note that, the multicast message is successfully received by each of the plurality of client devices. Further, the plurality of client devices includes (a) the first subset of client devices that are located in an approximate direction of the focus of the directional radiation pattern and (b) a second subset of client devices that are located in a different direction than the focus of the directional radiation pattern.

Multicast Environment

Figure 1:
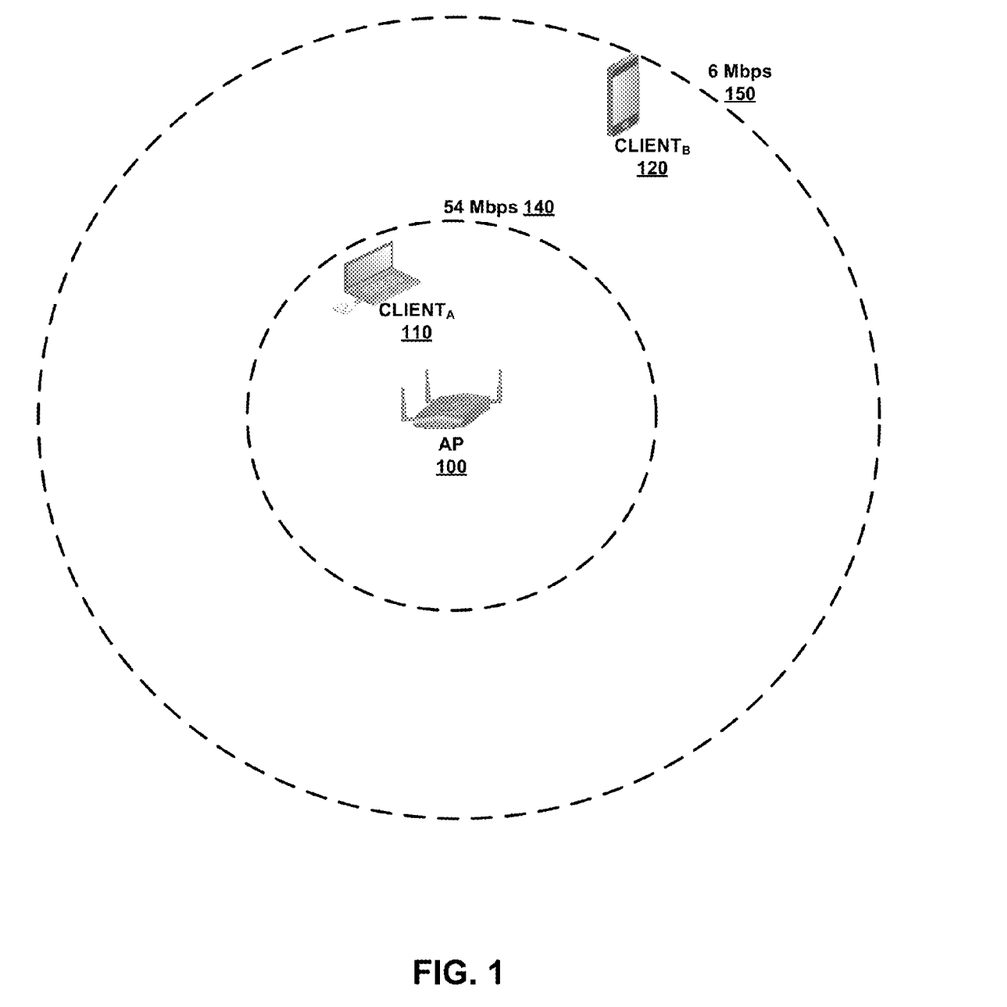
FIG. 1 shows exemplary multicast environment according to embodiments of the present disclosure.

FIG. 1 shows an exemplary multicast environment according to embodiments of the present disclosure. Specifically, FIG. 1 includes an access point (AP) 100 and at least two client devices $Client_A$ 100 and $Client_B$ 120. Here, assuming that both $Client_A$ 110 and $Client_B$ 120 subscribe to the same multicast group. Furthermore, $Client_A$ 110 is located within boundary of the coverage area corresponding to physical layer rate of 54 Mbps 140. On the other hand, $Client_B$ 120 is located within the boundary of the coverage area corresponding to a physical layer rate of 6 Mbps 150.

Conventionally, the WLAN infrastructure will determine which member client device of a particular multicast group is associated with the slowest physical layer rate. In the example illustrated in FIG. 1, AP 100 will decide that $Client_B$ 120 is associated with the slowest physical layer rate 6 Mbps. Therefore, AP 100 will use the slowest physical layer rate (e.g., 6 Mbps) as the multicast rate to transmit the multicast packets to multicast group member devices, including $Client_A$ 110, even though other member devices such as $Client_A$ 110 are associated with much higher physical layer rate. Because client devices do not send any acknowledgement frames upon receiving the multicast packets, sending the multicast packets at the slowest physical layer rate increases the likelihood that all of the client devices in the particular multicast group will receive the multicast packets successfully.

Multicast Aware Beamforming Mechanism

A. Beamforming to Single Device

Figure 2:
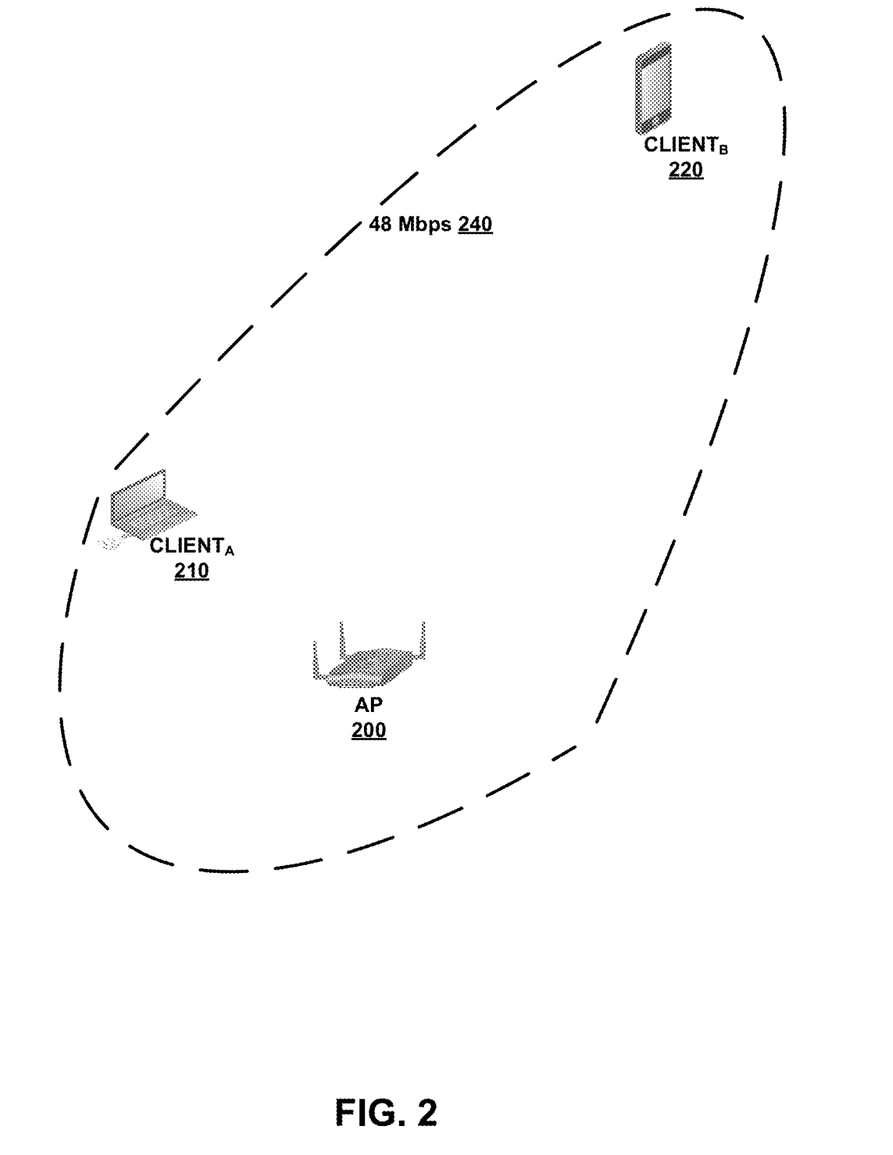
FIG. 2 shows exemplary multicast environment according to embodiments of the present disclosure.

FIG. 2 shows an exemplary multicast environment according to embodiments of the present disclosure. Specifically, FIG. 2 includes an access point (AP) 200 and at least two client devices $Client_A$ 210 and $Client_B$ 220. Here, assuming that both $Client_A$ 210 and $Client_B$ 220 subscribe to the same multicast group. Furthermore, without the multicast aware beamforming mechanism enabled, $Client_A$ 210 would be located within boundary of the coverage area corresponding to physical layer rate of 54 Mbps; and, $Client_B$ 220 would be located within the boundary of the coverage area corresponding to a physical layer rate of 6 Mbps. As illustrated in FIG. 1, the maximum multicast transmission rate for this multicast group would be 6 Mbps.

Nevertheless, FIG. 2 illustrates a beamforming mechanism that identifies the slowest member device(s) of a multicast group (e.g., $Client_B$ 220), and determines whether or not to beamform to the member device(s) that are the slowest. Furthermore, the disclosed multicast aware beamforming mechanism may evaluate the signal strength gain, e.g., in terms of signal-noise ratio (SNR), of a target client device such as $Client_B$ 220, the signal strength loss of other client devices in the multicast group such as $Client_A$ 210, the multicast traffic load, etc. The disclosed multicast aware beamforming mechanism determines whether to beamform to the target client device based on a combination of the above factors.

In the example illustrated in FIG. 2, AP 200 determines that it should beamform to $Client_B$ 220. By changing its radiation pattern through the disclosed beamforming mechanism, AP 200 can now reach both $Client_A$ 210 and $Client_B$ 220 with a physical layer rate of 48 Mbps 240 instead of 6 Mbps previously. Therefore, as subscribers to a multicast group, $Client_A$ 210 and $Client_B$ 220 now enjoy an improvement in physical layer rate by 42 Mbps. If AP 200 determines that $Client_A$ 210 does not suffer a significant signal strength loss, AP 200 will beamform to $Client_B$ 220 with the exemplary radiation pattern as shown in FIG. 2.

Note that, conventionally, beamforming technique is independent of the type of traffic (e.g., multicast traffic versus unicast traffic). Based on various algorithms, beamforming technique can be used to improve the signal gains for a particular client device. Moreover, beamforming technique may be limited to only a threshold number of client devices due to limitations of the WLAN chipset. For example, for an AP that can support up to 64 client devices, the AP may be able to beamform to only 3-5 client devices. Furthermore, there may be a limit in the number of times an AP can change the beamforming pattern. For example, if the beamforming pattern cannot be changed on a per-packet basis and there are multiple multicast groups, then the AP will need to choose one beamforming pattern that provides maximum benefits.

Usually, beamforming is negotiated as a part of wireless client association phase. Thus, during the association phase of a client device, the AP may decide whether or not to beamform to the particular client device, and which physical area the AP should be beamform to in order for the AP's signal to reach the client device. The negotiation allows for the AP to find out which beamforming technique is supported by the client, e.g., an implicit beamforming technique versus an explicit beamforming technique. With the explicit beamforming technique, a client device has to support beamforming to send to the AP channel feedback information. Moreover, beamforming usually can be done on a per-packet basis. However, if the beamforming pattern cannot be changed on a per-packet basis and there are multiple multicast groups, then the AP will need to choose one beamforming pattern that provides maximum benefits. Also, the AP can choose whether or not to beamform to a particular client device.

B. Beamforming to Multiple Devices

Figure 3A:
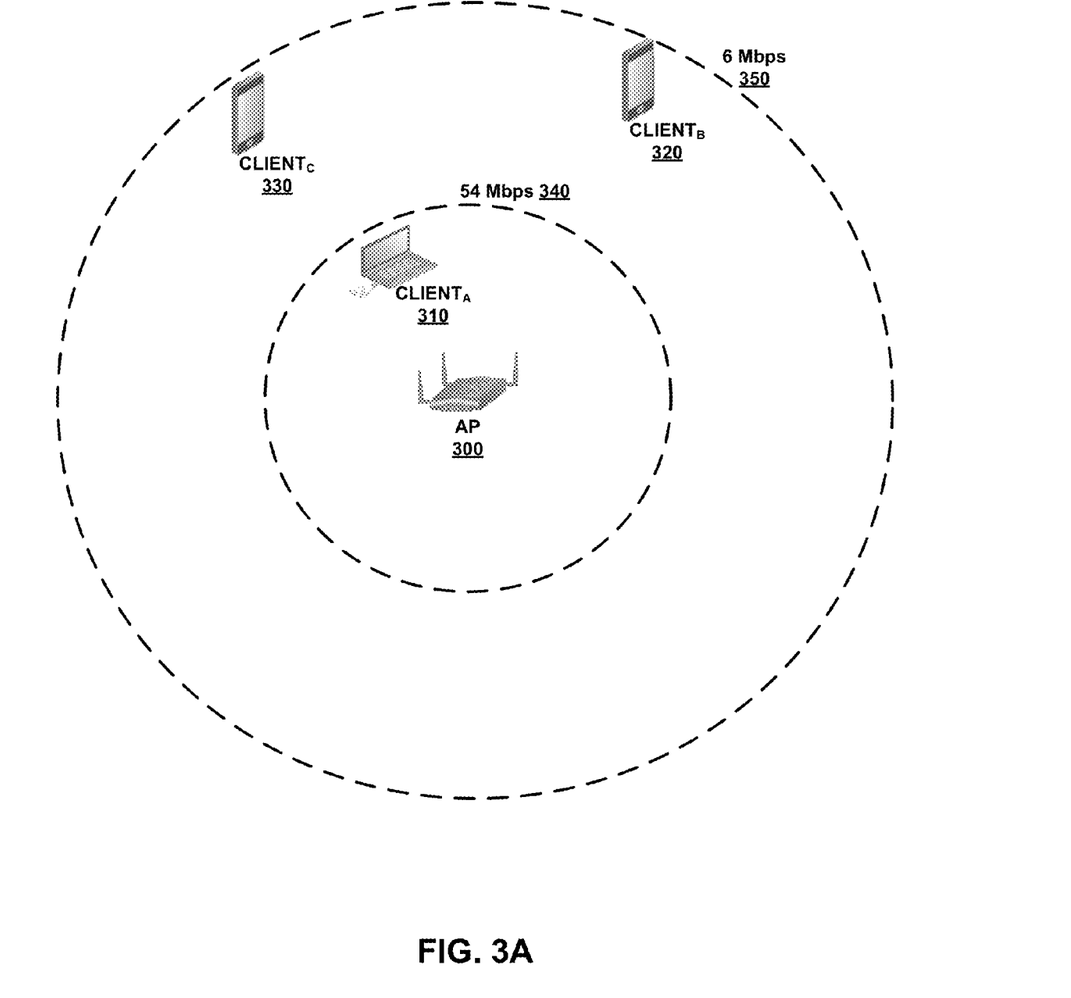
FIG. 3A-3B show exemplary multicast environments according to embodiments of the present disclosure.
Figure 3B:
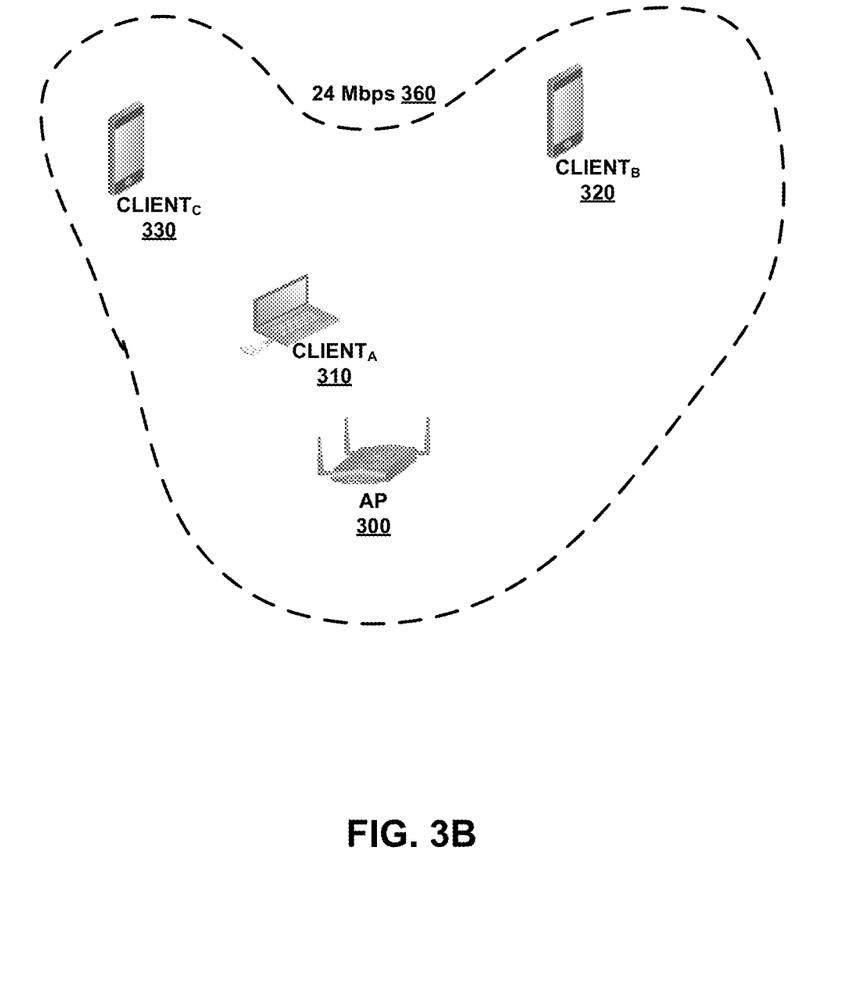

FIGS. 3A-3B illustrate alternative exemplary multicast environments according to embodiments of the present disclosure. Specifically, FIG. 3A includes an access point (AP) 300 and at least three client devices $Client_A$ 310, $Client_B$ 320, and $Client_C$ 330. AP 300 and client devices herein are in compliance with IEEE 802.11 ac standards. Here, assuming that all of $Client_A$ 310, $Client_B$ 320, and $Client_C$ 330 subscribe to the same multicast group. Furthermore, $Client_A$ 310 is located within boundary of the coverage area corresponding to physical layer rate of 54 Mbps. Also, $Client_B$ 320 and $Client_C$ 330 are located within the boundary of the coverage area corresponding to a physical layer rate of 6 Mbps. As mentioned above, without the multicast aware beamforming mechanism enabled, the conventional maximum multicast transmission rate for this multicast group would be 6 Mbps, which corresponds to the slowest physical layer rate among all client devices in the multicast group.

FIG. 3B illustrates an exemplary multicast environment with multicast-aware beamforming mechanism enabled. Specifically, FIG. 3B includes an access point (AP) 300 and at least three client devices $Client_A$ 310, $Client_B$ 320, and $Client_C$ 330. Here, assuming that all of $Client_A$ 310, $Client_B$ 320, and $Client_C$ 330 subscribe to the same multicast group. Furthermore, $Client_A$ 310 is located within boundary of the coverage area corresponding to physical layer rate of 54 Mbps. Also, $Client_B$ 320 and $Client_C$ 330 are located within the boundary of the coverage area corresponding to a physical layer rate of 6 Mbps. As mentioned above, without the multicast aware beamforming mechanism enabled, the conventional maximum multicast transmission rate for this multicast group would be 6 Mbps, which corresponds to the slowest physical layer rate among all client devices in the multicast group. By enabling the multicast aware beamforming mechanism, AP 300 can beamform to multiple client devices, e.g., $Client_B$ 320 and $Client_C$ 330, as illustrated in FIG. 3B. The coverage area illustrated in FIG. 3B corresponds to physical layer rate of 24 Mbps 360. Thus, both $Client_B$ 320 and $Client_C$ 330 have an improvement in physical layer rate by 18 Mbps after being selected as beamforming targets by AP 300.

Generally, beamforming to multiple multicast member devices is most useful when the physical layer rates corresponding to slowest few client devices in the multicast group do not vary much from each other, but are much lower than the physical layer rate of other member client devices within the same multicast group. Thus, in some embodiments, AP 300 may determine the physical layer rate of the slowest 3-5 client devices in the multicast group, e.g., C1, C2, C3, C4, and C5 anked from the slowest to the fastest physical layer rate. In one example, C2-C5 share the same physical layer rate of 54 Mbps; and, C1's physical layer rate is 6 Mbps. Accordingly, AP 300 will determine to beamform only to C1, a single client device, such that the group will have an improved multicast rate of 48 Mbps, compared to 6 Mbps without the multicast aware beamforming mechanism enabled.

In another example, if C1 and C2 both correspond to a physical layer rate of 6 Mbps; and, C3-C5 correspond to a physical layer rate of 54 Mbps. Then, AP 300 will determine to beamform to multiple client devices including both C1 and C2, such that the group will have an improved multicast rate of 24 Mbps, compared to 6 Mbps with single device beamforming to C1 or C2. Note that, beamforming to C1 only in this example would result in a corresponding physical layer rate of 48 Mbps, 6 Mbps, 54 Mbps, 54 Mbps, and 54 Mbps for C1, C2, C3, C4, and C5. Therefore, the group multicast rate would be 6 Mbps, which is the slowest physical layer rate of all member devices. By contrast, beamforming to both C1 and C2 may result in a corresponding physical layer rate of 24 Mbps, 24 Mbps, 54 Mbps, 54 Mbps, and 54 Mbps for C1, C2, C3, C4, and C5. Therefore, the group multicast rate would be 24 Mbps, which is superior than beamforming to a single client device in the multicast group in this particular exemplary scenario.

C. Beamforming Adjustment

Figure 4A:
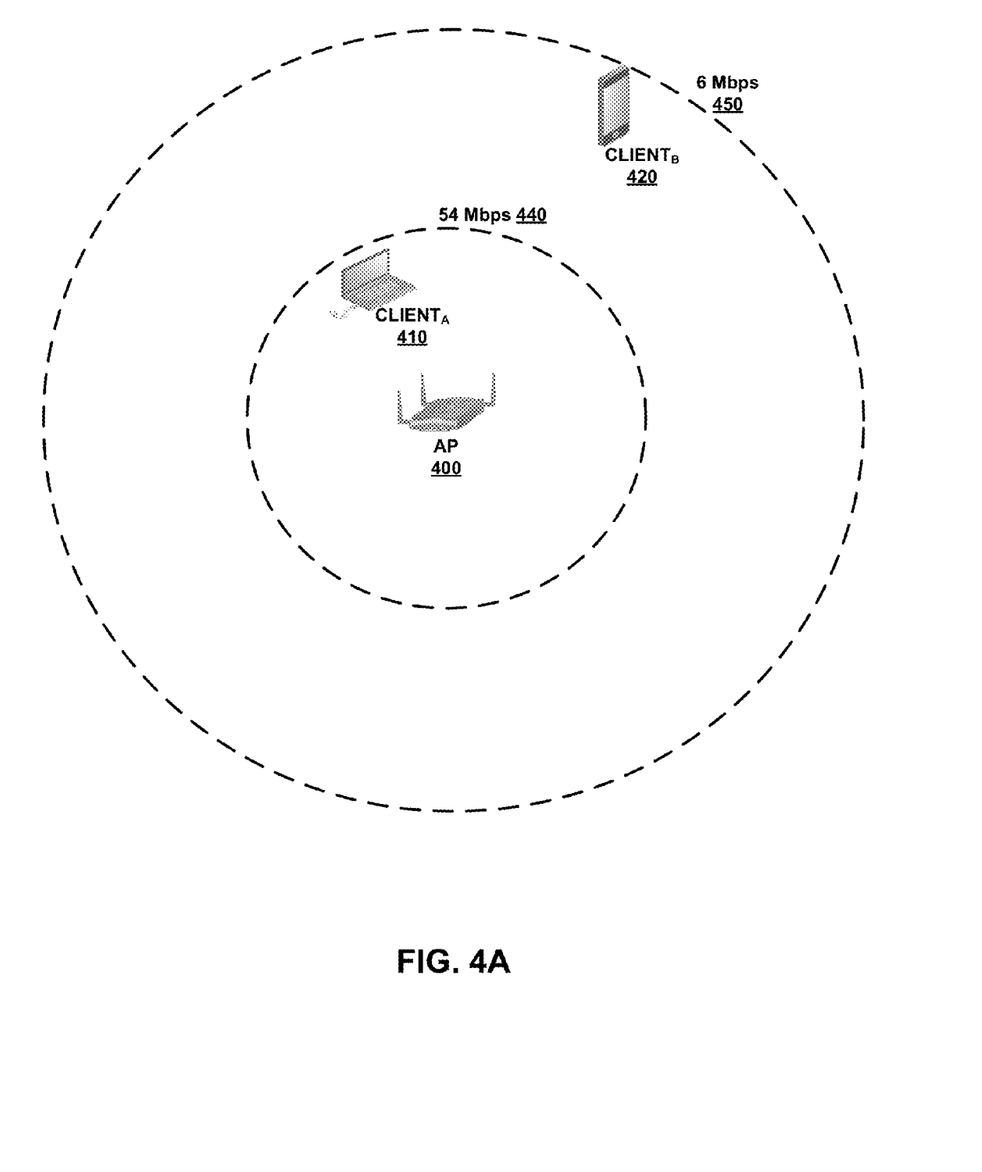
FIG. 4A-4C show exemplary multicast environments according to embodiments of the present disclosure.
Figure 4B:
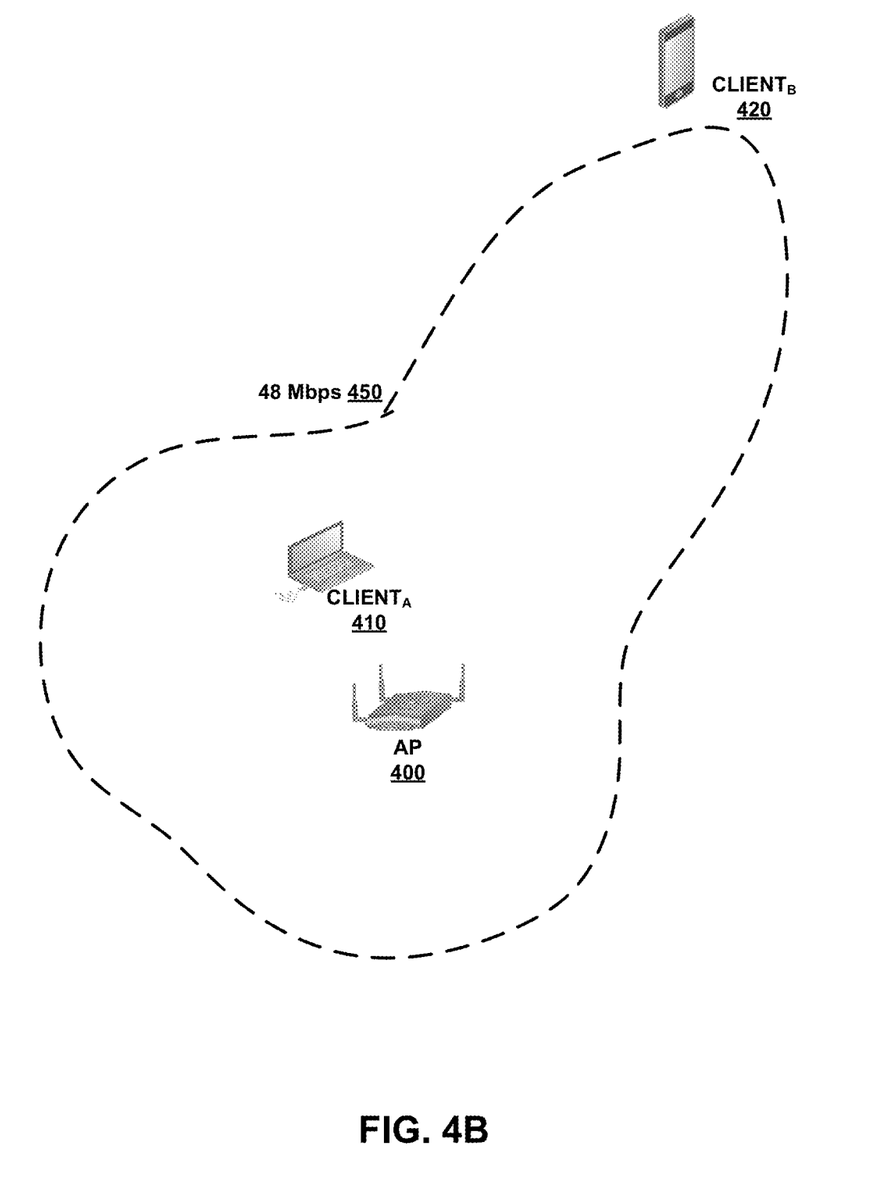
Figure 4C:
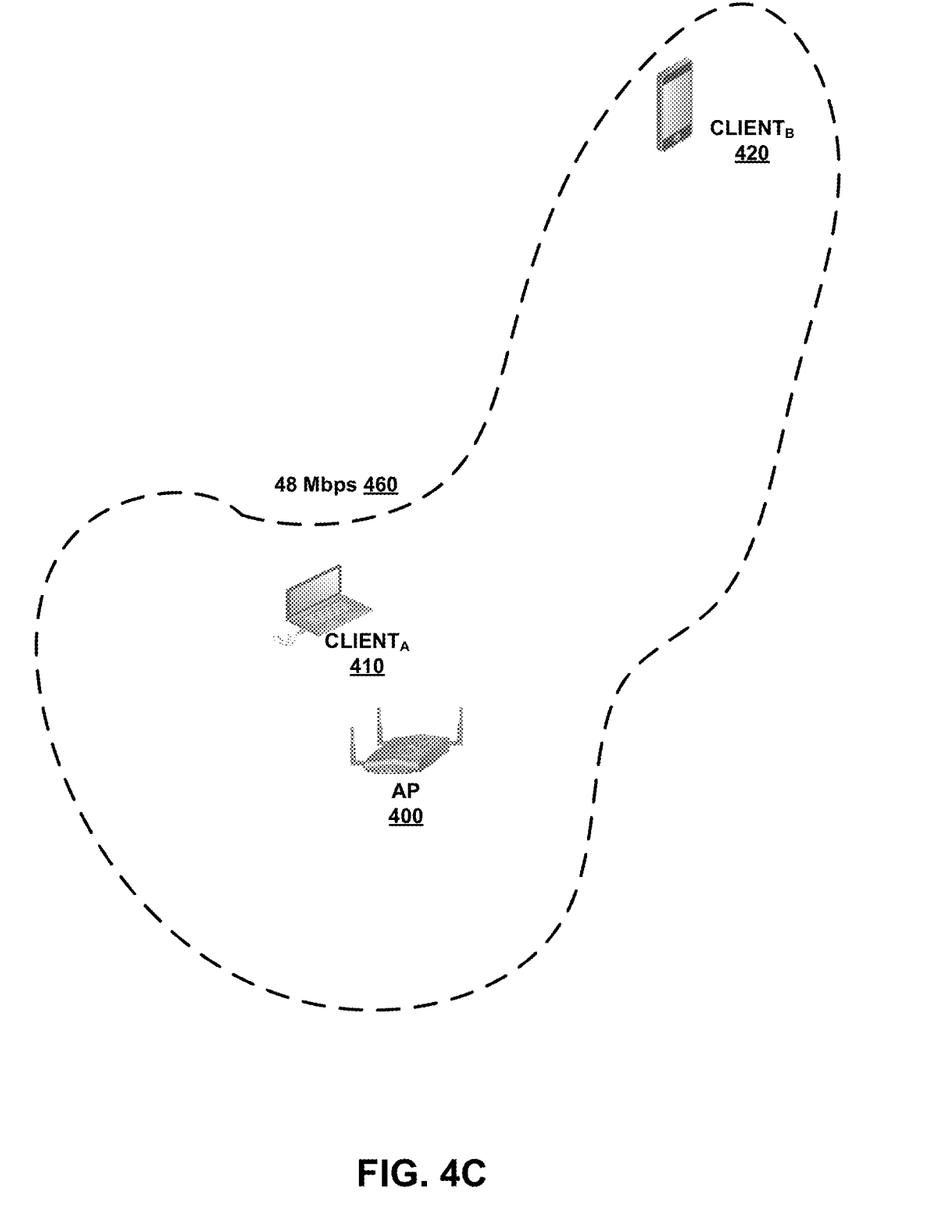

FIGS. 4A-4C show exemplary multicast environments according to embodiments of the present disclosure. Specifically, FIG. 4A includes an access point (AP) 400 and at least two client devices $Client_A$ 410 and $Client_B$ 420. Here, assuming that both $Client_A$ 410 and $Client_B$ 420 subscribe to the same multicast group. Furthermore, without the multicast aware beamforming mechanism enabled, $Client_A$ 410 would be located within boundary of the coverage area corresponding to physical layer rate of 54 Mbps; and, $Client_B$ 420 would be located within the boundary of the coverage area corresponding to a physical layer rate of 6 Mbps. Therefore, the maximum multicast transmission rate for this multicast group would be 6 Mbps.

FIG. 4B illustrates a beamforming mechanism that identifies the slowest member device(s) of a multicast group (e.g., $Client_B$ 420), and determines to beamform to the slowest member device. For example, AP 400 may form a non-omnidirectional beamforming radiation pattern toward $Client_B$ 420, which results in the enclosed coverage area corresponding to an improved physical layer rate of 48 Mbps as shown in FIG. 4B.

Note that, it is possible that $Client_B$ 420 is still located outside AP 400's multicast coverage area after the initial beamforming radiation pattern. In such scenarios, AP 400 can detect that $Client_B$ 420 (i.e., the beamforming target member client device) is located outside the initial beamforming radiation pattern by transmitting a unicast packet that is destined to $Client_B$ 420. If AP 400 subsequently receives an acknowledgement packet (ACK) from $Client_B$ 420, it indicates that $Client_B$ 420 is located within AP 400's multicast coverage area after the initial beamforming radiation pattern. On the other hand, if AP 400 subsequently fails to receive any acknowledgement packet (ACK) from $Client_B$ 420, it indicates that $Client_B$ 420 is located outside AP 400's multicast coverage area after the initial beamforming radiation pattern.

According to embodiments of the present disclosure, AP 400 is capable of adjusting antenna phased array to achieve slightly different beamforming radiation pattern. For example, in FIG. 4C, AP 400 has adjusted the beamforming radiation pattern to be more focused toward $Client_B$ 420 than the beamforming radiation pattern shown in FIG. 4B. Although the physical layer rate remains the same at 48 Mbps, the new beamforming radiation pattern at 48 Mbps 460 allows AP 400's multicast wireless signals to reach both $Client_A$ 410 and $Client_B$ 420.

Moreover, AP 400 also monitors other client devices in the same multicast group, e.g., $Client_A$ 410, to make sure that the new beamforming radiation pattern that is more focused toward $Client_B$ 420 is not too strong to impair the SNR of other client devices with the same multicast group. If, for example, AP 400 detects that $Client_A$ 410's SNR has been significantly reduced with the new beamforming radiation pattern, AP 400 can further adjust the beamforming radiation pattern to be less focused to $Client_B$ 420. In some embodiments, if AP 400 detects that $Client_A$ 410's SNR has been significantly reduced with the new beamforming radiation pattern, AP 400 will not beamform to $Client_A$ 410, but select a different subset of client devices to beamform to. This beamforming adjustment can be automatically performed by AP 400 until AP 400 determines an optimal beamforming radiation pattern that covers both $Client_A$ 410 and $Client_B$ 420 with a good physical layer rate, and that does not significantly reduces the signal strength received by the non-beamformed member client devices of the multicast group.

In summary, according to embodiments of the present disclosure, a network device such as an access point can determine whether more than one multicast group member devices have significant amount of active data traffic active. If so, the network device further determines if the difference between the slowest client device and the second-slowest client device is significant. From the rate table, the network device can estimate the amount of SNR gain needed at the slowest client device to achieve a faster speed. For example, a beamforming gain that improves the slowest client by 2.5 dB can improve the physical layer rate by 30 Mbps, i.e. the slowest client can now transmit at 36 Mbps instead of 6 Mbps after beamforming.

Next, the network device determines the airtime savings. For example, if the network device is sending 1 Mbps of multicast traffic, then multicasting at 36 Mbps instead of 6 Mbps will save 83% of the original airtime spent in multicasting. In addition, the network device determines if the beamforming will affect any of the other client devices in the group, for example, by reduce their physical layer rate to below 36 Mbps. If so, the network device can determine the slowest rate and repeat the process to recalculate the optimal beamforming results.

With respect to airtime savings, the network device may use the following formula to determine the airtime savings for multiple client devices:

$$A1 = (X/O) - (X/N) - S1$$

$$A2 = (X/O) - (X/N) - S1 - S2$$

Here, A1 refers to the airtime savings for the first beamforming target client device. A2 refers to the airtime savings for the second beamforming target client device. X indicates the multicast load in bits per second. O indicates the old multicast rate. N indicates the new multicast rate. S1 indicates the beamforming sounding cost corresponding to the first beamforming target client device, which is approximately 500 microseconds. S2 indicates the beamforming sounding cost corresponding to the second beamforming target client device in the same multicast group. If the calculated airtime savings is greater than a predetermined threshold value, the network device will determine to beamform to selected client device(s) subscribing to a particular multicast group. Otherwise, the network device will determine not to beamform to the multicast group member client devices.

Process for Multicast Aware Beamforming for WLANs

Figure 5:
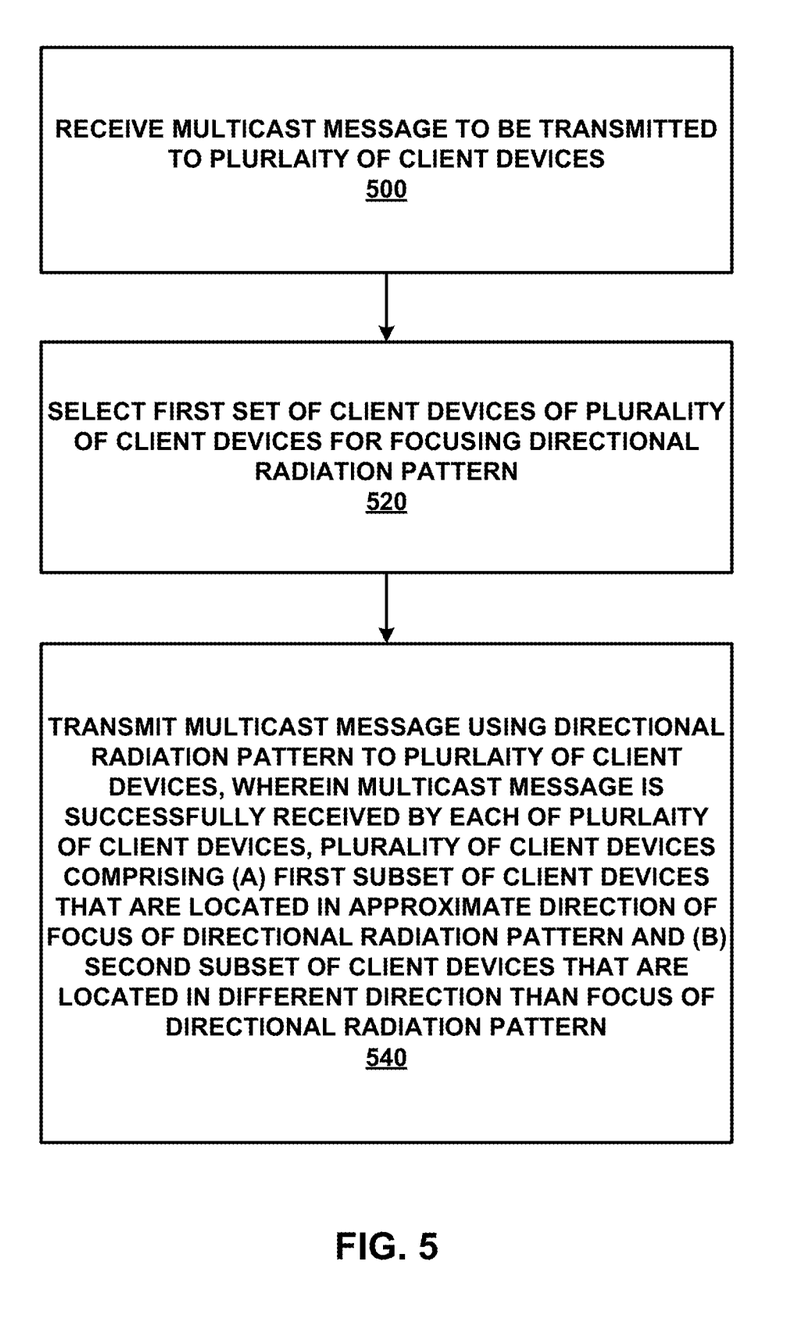
FIG. 5 illustrates an exemplary process for multicast aware beamforming for wireless local area networks according to embodiments of the present disclosure.

FIG. 5 illustrates an exemplary process for multicast aware beamforming for WLANs according to embodiments of the present disclosure. During operations, a network device receives a multicast message to be transmitted to a plurality of client devices (operation 500). The network device then selects a first subset of client devices of the plurality of client devices for focusing a directional radiation pattern (operation 520). Furthermore, the network device transmits the multicast message using the directional radiation pattern to the plurality of client devices (operation 540). Here, the multicast message is successfully received by each of the plurality of client devices. The plurality of client devices include (a) the first subset of client devices that are located in an approximate direction of the focus of the directional radiation pattern and (b) a second subset of client devices that are located in a different direction than the focus of the directional radiation pattern.

In some embodiments, the network device selects the first subset of client devices such that a physical layer rate that can be used for successful transmission to all of the plurality of client devices, in combination, increases. In some embodiments, the network device selects the first subset of client devices such that a physical layer rate, of the respective physical layer rates that can be used for transmitting a message to each of the plurality of client devices, is optimized.

In some embodiments, the first subset of client devices consists of a single client device; and, the directional radiation pattern is focused in a direction of the single client device. In some embodiments, the first subset of client devices includes both a first client device and a second client device. Moreover, the directional radiation pattern is (a) focused in a first direction toward the first client device and (b) focused in a second direction toward the second client device. In some embodiments, the directional radiation pattern is used to transmit to a third client device that is in a third direction different than any focus of the directional radiation pattern; and, the third client device is closer to a transmitting device than the first client device and the second client device.

In some embodiments, the disclosed network device further dynamically modifies the directional radiation pattern for optimizing receipt of a multicast message by the plurality of client devices. The directional radiation pattern can be dynamically modified without modification of a direction of a focus of the directional radiation pattern. Also, the directional radiation pattern can be dynamically modified without modifying the first subset of client devices used for focusing the directional radiation pattern. In some embodiments, the directional radiation pattern is dynamically modified using a programmable array of antennas.

In some embodiments, the network device selects the first subset of client devices for focusing the directional radiation pattern in response to determining that the first subset of client devices can receive data at a lower physical layer transmission rate than at least one other client device in the plurality of client devices when using an omnidirectional antenna.

In some embodiments, the network device selects the first subset of client devices of the plurality of client devices for focusing the directional radiation pattern in response to transmitting a particular unicast message using a omnidirectional radiation pattern and a particular transmit power; and determining that the particular unicast message was not successfully received by at least one client device of the plurality of client devices. In some embodiments, the disclosed network device further dynamically determines the first subset of client devices, from the plurality of client devices, for focusing the directional radiation pattern.

System for Multicast Aware Beamforming for WLANs

Figure 6:
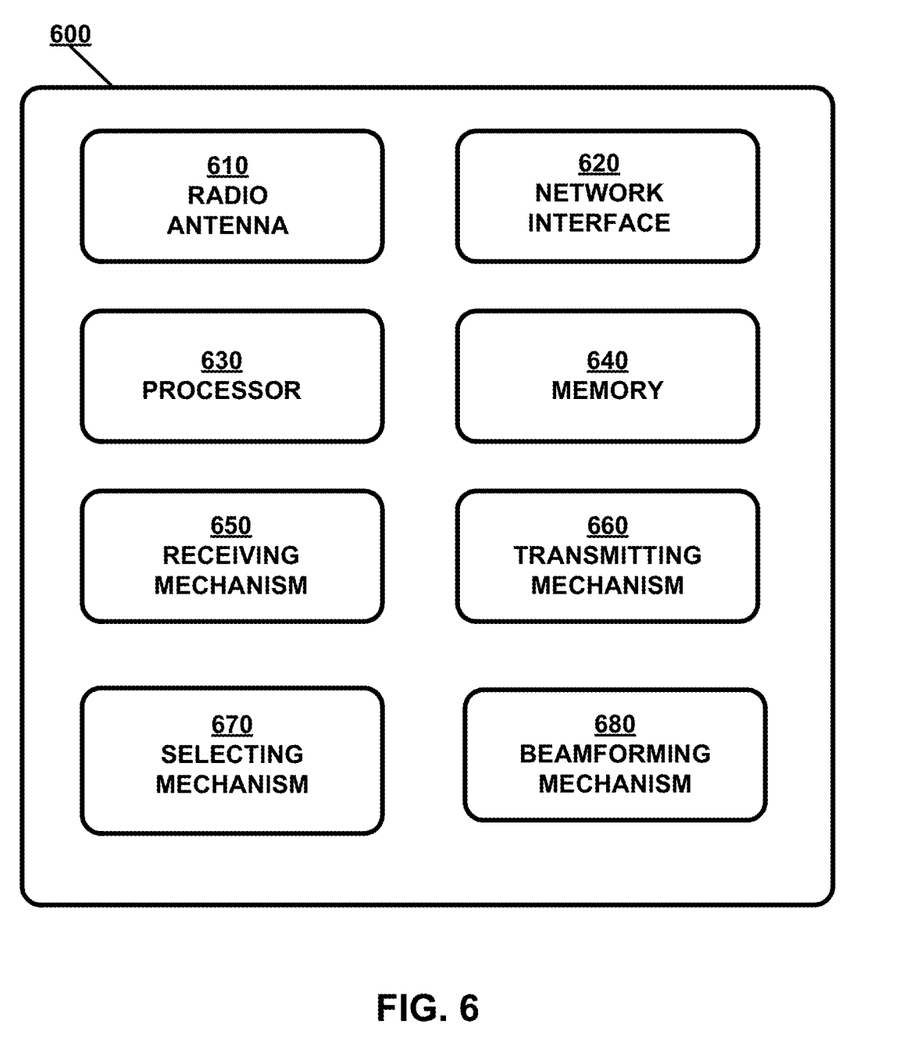
FIG. 6 is a block diagram illustrating an exemplary system for multicast aware beamforming for wireless local area networks according to embodiments of the present disclosure.

FIG. 6 is a block diagram illustrating a system for multicast aware beamforming for WLANs according to embodiments of the present disclosure.

Network device 600 includes at least one or more radio antennas 610 capable of either transmitting or receiving radio signals or both, a network interface 620 capable of communicating to a wired or wireless network, a processor 630 capable of processing computing instructions, and a memory 640 capable of storing instructions and data. Moreover, network device 600 further includes an receiving mechanism 650, a transmitting mechanism 660, and a selecting mechanism 670, and a beamforming mechanism 680, all of which are in communication with processor 630 and/or memory 640 in network device 600. Network device 600 may be used as a client system, or a server system, or may serve both as a client and a server in a distributed or a cloud computing environment.

Radio antenna 610 may be any combination of known or conventional electrical components for receipt of signaling, including but not limited to, transistors, capacitors, resistors, multiplexers, wiring, registers, diodes or any other electrical components known or later become known.

Network interface 620 can be any communication interface, which includes but is not limited to, a modem, token ring interface, Ethernet interface, wireless IEEE 802.11 interface, cellular wireless interface, satellite transmission interface, or any other interface for coupling network devices.

Processor 630 can include one or more microprocessors and/or network processors. Memory 640 can include storage components, such as, Dynamic Random Access Memory (DRAM), Static Random Access Memory (SRAM), etc.

Receiving mechanism 650 generally receives one or more network messages via network interface 620 or radio antenna 610 from a wireless client. The received network messages may include, but are not limited to, requests and/or responses, beacon frames, management frames, control path frames, and so on. In some embodiments, receiving mechanism 650 can receive a multicast message to be transmitted to a plurality of client devices.

Transmitting mechanism 660 generally transmits messages, which include, but are not limited to, requests and/or responses, beacon frames, management frames, control path frames, and so on. In some embodiments, transmitting mechanism 660 transmits the multicast message using a directional radiation pattern to the plurality of client devices, whereas the multicast message is successfully received by each of the plurality of client devices. Further, the plurality of client devices include (a) the first subset of client devices that are located in an approximate direction of the focus of the directional radiation pattern and (b) a second subset of client devices that are located in a different direction than the focus of the directional radiation pattern.

In some embodiments, transmitting mechanism 660 transmits a particular unicast message using a omnidirectional radiation pattern and a particular transmit power. Furthermore, in response to not receiving an acknowledgment, selecting mechanism 670 described below will select a first subset of client devices of the plurality of client devices for focusing the directional radiation pattern.

Selecting mechanism 670 generally selects a first subset of client devices of a plurality of client devices in a multicast group for focusing a directional radiation pattern toward. Specifically, selecting mechanism 670 can select the first subset of client devices for focusing the directional pattern comprises selecting the first subset of client devices such that a physical layer rate that can be used for successful transmission to all of the plurality of client devices, in combination, increases.

In some embodiments, selecting mechanism 670 selects the first subset of client devices for focusing the directional pattern comprises selecting the first subset of client devices such that a physical layer rate, of the respective physical layer rates that can be used for transmitting a message to each of the plurality of client devices, is optimized.

In some embodiments, the first subset of client devices may consist of a single client device. In such cases, the directional radiation pattern is focused in a direction of the single client device.

In some embodiments, the first subset of client devices includes a first client device and a second client device. In such cases, the directional radiation pattern is (a) focused in a first direction toward the first client device, and (b) focused in a second direction toward the second client device.

In some embodiments, the directional radiation pattern is used to transmit to a third client device that is in a third direction different than any focus of the directional radiation pattern. In such cases, the third client device is closer to a transmitting device than the first client device and the second client device.

Beamforming mechanism 680 generally applies and/or modifies a radiation pattern. The radiation pattern may be either omnidirectional or directional with energy targeting toward a particular direction where a client device is located. Specifically, beamforming mechanism 680 can dynamically modify a directional radiation pattern for optimizing receipt of a multicast message by the plurality of client devices. Moreover, beamforming mechanism 680 can dynamically determine the first subset of client devices, from the plurality of client devices, for focusing the directional radiation pattern.

In some embodiments, the directional radiation pattern is dynamically modified without modification of a direction of a focus of the directional radiation pattern. In some embodiments, the directional radiation pattern is dynamically modified without modifying the first subset of client devices used for focusing the directional radiation pattern. In some embodiments, the directional radiation pattern is dynamically modified using a programmable array of antennas.

In some embodiments, selecting mechanism 670 selects the first subset of client devices for focusing the directional radiation pattern in response to beamforming mechanism 680 determining that the first subset of client devices can receive data at a lower physical layer transmission rate than at least one other client device in the plurality of client devices when using an omnidirectional antenna.

In some embodiments, selecting mechanism 670 selects the first subset of client devices of the plurality of client devices for focusing the directional radiation pattern in response to beamforming mechanism 680 determining that the particular unicast message was not successfully received by at least one client device of the plurality of client devices.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by one or more hardware processors, causes performance of operations comprising:
   receiving a multicast message to be transmitted to a plurality of client devices;
   determining that a first subset of client devices of the plurality of client devices receive data at similar slowest physical layer transmission rates and that a second subset of client devices of the plurality of client devices receives data at higher than the physical layer transmission rates corresponding to the first subset of client devices, wherein the second subset of client devices comprises client devices in the plurality of client devices that do not belong to the first subset of client devices;
   selecting the first subset of client devices of the plurality of client devices for focusing a directional radiation pattern by beamforming to the first subset of client devices;
   transmitting the multicast message using the directional radiation pattern to the first subset of client devices and the second subset of client devices.

2. The medium of claim 1, wherein selecting the first subset of client devices for focusing the directional pattern comprises selecting the first subset of client devices such that a physical layer rate that can be used for successful transmission to all of the plurality of client devices, in combination, increases.

3. The medium of claim 1, wherein selecting the first subset of client devices for focusing the directional pattern comprises selecting the first subset of client devices such that a physical layer rate, of the respective physical layer rates that can be used for transmitting a message to each of the plurality of client devices, is optimized.

4. The medium of claim 1, wherein the first subset of client devices consists of a single client device, and wherein the directional radiation pattern is focused in a direction of the single client device.

5. The medium of claim 1, wherein the first subset of client devices comprises a first client device and a second client device, wherein the directional radiation pattern is (a) focused in a first direction toward the first client device and (b) focused in a second direction toward the second client device.

6. The medium of claim 5, wherein the directional radiation pattern is used to transmit to a third client device that is in a third direction different than any focus of the directional radiation pattern, and wherein the third client device is closer to a transmitting device than the first client device and the second client device.

7. The medium of claim 1, wherein the operations further comprise dynamically modifying the directional radiation pattern for optimizing receipt of a multicast message by the plurality of client devices.

8. The medium of claim 7, wherein the directional radiation pattern is dynamically modified without modification of a direction of a focus of the directional radiation pattern.

9. The medium of claim 7, wherein the directional radiation pattern is dynamically modified without modifying the first subset of client devices used for focusing the directional radiation pattern.

10. The medium of claim 7, wherein the directional radiation pattern is dynamically modified using a programmable array of antennas.

11. The medium of claim 1, wherein selecting the first subset of client devices for focusing the directional radiation pattern is responsive to determining that the first subset of client devices can receive data at a lower physical layer transmission rate than at least one other client device in the plurality of client devices when using an omnidirectional antenna.

12. The medium of claim 1, wherein the operations further comprise:
   wherein selecting the first subset of client devices of the plurality of client devices for focusing the directional radiation pattern is responsive to:
   transmitting a particular unicast message using a omnidirectional radiation pattern and a particular transmit power;
   determining that the particular unicast message was not successfully received by at least one client device of the plurality of client devices.

13. The medium of claim 1, further comprising dynamically determining the first subset of client devices, from the plurality of client devices, for focusing the directional radiation pattern.

14. A network device comprising:
   at least one hardware processor;
   the network device being configured to perform operations comprising:
   receiving a multicast message to be transmitted to a plurality of client devices;
   determining that a first subset of client devices of the plurality of client devices receive data at similar slowest physical layer transmission rates and that a second subset of client devices of the plurality of client devices receive data at higher than the physical layer transmission rates corresponding to the first subset of client devices, wherein the second subset of client devices comprises client devices in the plurality of client devices that do not belong to the first subset of client devices;

selecting the first subset of client devices of the plurality of client devices for focusing a directional radiation pattern by beamforming to the first subset of client devices;

transmitting the multicast message using the directional radiation pattern to the first subset of client devices and second subset of client devices.

15. The network device of claim 14, wherein selecting the first subset of client devices for focusing the directional pattern comprises selecting the first subset of client devices such that a physical layer rate that can be used for successful transmission to all of the plurality of client devices, in combination, increases.

16. The network device of claim 14, wherein selecting the first subset of client devices for focusing the directional pattern comprises selecting the first subset of client devices such that a physical layer rate, of the respective physical layer rates that can be used for transmitting a message to each of the plurality of client devices, is optimized.

17. The network device of claim 14, wherein the first subset of client devices consists of a single client device, and wherein the directional radiation pattern is focused in a direction of the single client device.

18. The network device of claim 14, wherein the first subset of client devices comprises a first client device and a second client device, wherein the directional radiation pattern is (a) focused in a first direction toward the first client device and (b) focused in a second direction toward the second client device.

19. The network device of claim 14, wherein the operations further comprise dynamically modifying the directional radiation pattern for optimizing receipt of a multicast message by the plurality of client devices.

20. The network device of claim 14, wherein selecting the first subset of client devices for focusing the directional radiation pattern is responsive to determining that the first subset of client devices can receive data at a lower physical layer transmission rate than at least one other client device in the plurality of client devices when using an omnidirectional antenna.

21. The network device of claim 14,
wherein selecting the first subset of client devices of the plurality of client devices for focusing the directional radiation pattern is responsive to:
transmitting a particular unicast message using a omnidirectional radiation pattern and a particular transmit power;
determining that the particular unicast message was not successfully received by at least one client device of the plurality of client devices.

22. The network device of claim 14, wherein the operations further comprise dynamically determining the first subset of client devices, from the plurality of client devices, for focusing the directional radiation pattern.

* * * * *